US005110640A

United States Patent [19]

Mack

[11] Patent Number: 5,110,640

[45] Date of Patent: May 5, 1992

[54] DETERGENT POUCH CONSTRUCTION

[75] Inventor: Robert J. Mack, Flemington, N.J.

[73] Assignee: Colgate-Palmolive Company, Piscataway, N.J.

[21] Appl. No.: 525,786

[22] Filed: May 18, 1990

[51] Int. Cl.[5] .......................... B05D 1/14; B05D 1/16; B32B 33/00; B32B 3/02

[52] U.S. Cl. .................................... 428/35.2; 252/90; 252/93; 428/297; 428/301; 428/283

[58] Field of Search ............... 428/284, 300, 288, 290, 428/35.2, 36.1; 252/90, 92

[56] References Cited

U.S. PATENT DOCUMENTS

| | | | |
|---|---|---|---|
| 4,188,034 | 2/1980 | Clarke et al. | 252/93 |
| 4,190,550 | 2/1980 | Campbell | 428/300 |
| 4,348,293 | 9/1982 | Clarke et al. | 252/90 |
| 4,555,354 | 11/1985 | Clarke et al. | 252/90 |
| 4,853,143 | 8/1989 | Hardy et al. | 252/90 |

*Primary Examiner*—George F. Lesmes
*Assistant Examiner*—Richard C. Weisberger
*Attorney, Agent, or Firm*—Michael J. McGreal; Murray M. Grill; Robert C. Sullivan

[57] ABSTRACT

A detergent laundry pouch constructed of a pair of web layers having detergent therebetween and sealed along the periphery of the pouch. The web material contains primarily crimped fibers of water sensitive material which loses its crimp when immersed in the laundry liquor, thus forming interstices which can pass the particles of detergent.

9 Claims, 1 Drawing Sheet

FIG. 1
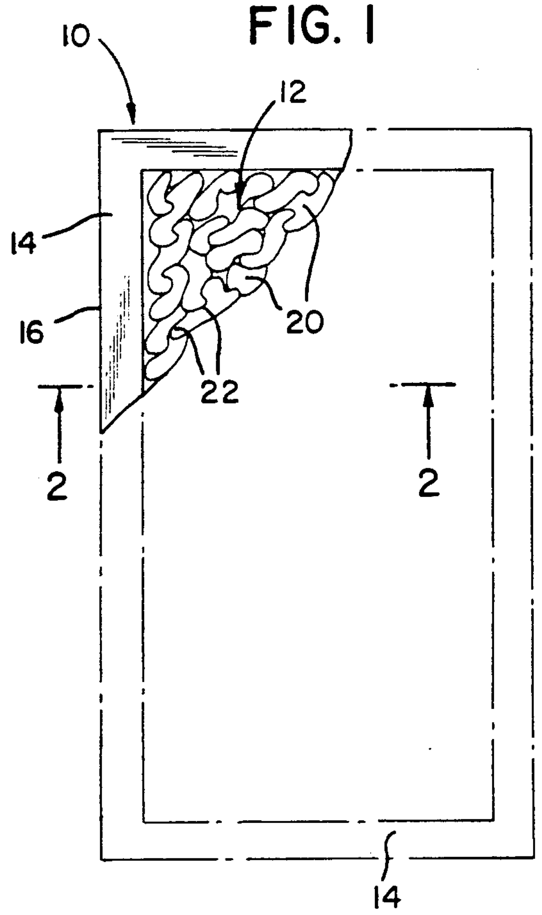
FIG. 3
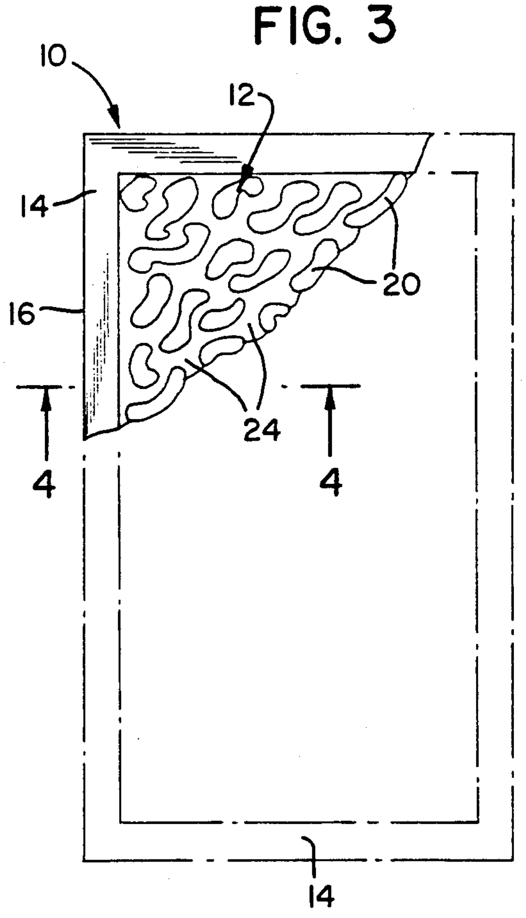
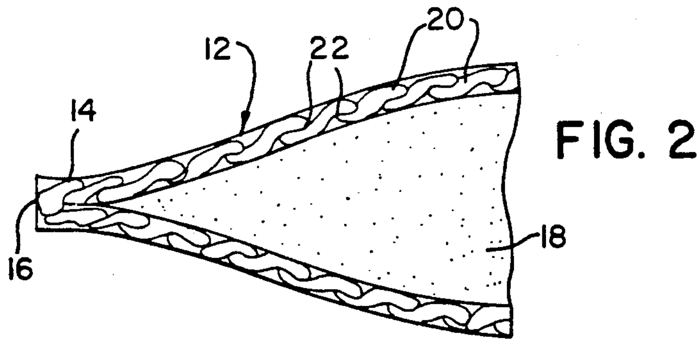
FIG. 2
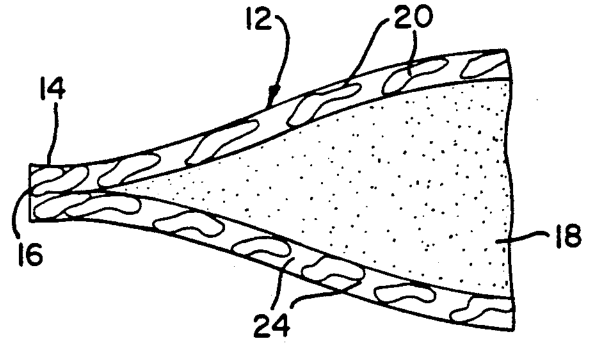
FIG. 4

DETERGENT POUCH CONSTRUCTION

BACKGROUND OF THE INVENTION

1. Field of the Invention

This invention relates to detergent pouch construction of a type for ensuring full disposition of the detergent content of the pouch into the laundry liquor.

Water sensitive fibers are formed into a web or sheet. The interfiber spacing is selected such that laundry detergent particles are contained by the web or sheet. When the detergent containing pouch made of the web or sheet is wetted, the fibers loose a predetermined crimp. The length of fiber between bonding sites increases and the interstices enlarge. The detergent contained within the pouch can then pass through into the laundry liquor.

2. Description of the Prior Art

Many users of automatic laundry machines prefer to use pouches of detergent because such provides ease of use, reduces waste of detergent by providing a premeasured amount of detergent compatible with the capacity of the average washing machine, while also eliminating contact of the detergent with the hands of the user, and facilitates general neatness of the laundry area.

However, in the past, various difficulties have arisen with the pouches of the prior art since the fabric of some pouches fail to hold detergent powder therein, while others have openings too small to allow for full passage of the detergent into the washing liquid.

U.S. Pat. No. 4,188,304 discloses the use of laundry pouches having water sensitive side seals which cause the construction to open at one or more seams when immersed.

In another U.S. Pat. No. 4,555,354, there is taught the use of mechanically weak seals which become unsealed due to the agitating action of the washing machine. Rough handling of this product during transportation and merchandising can lead to failure of the seals prematurely.

U.S. Pat. No. 4,348,293 relates to water soluble sheets or coatings adhered to the porous non-woven substrate which, when dissolved, permit the transport of the detergent powders through the intersticed spacings.

SUMMARY OF THE INVENTION

It is the object of this invention to produce a detergent pouch construction wherein high to medium crimped, water sensitive, staple-length fibers are formed into a web or sheet construction using traditional web forming techniques, i.e. fiber carding, air laying, needlepunching, felting and the like. The sheet thickness or interfiber spacing is controlled such that the fine particles encountered with laundry detergent powder manufacturing will be contained by the sheet. The sheet is pattern bonded, again using known techniques, i.e. chemical print bonding, heat pattern bonding, etc. so that sufficient dry strength is attained to afford complete containment of the laundry powder within the unit dose pouch throughout the manufacturing, shipping and consumer handling phases of use. The water sensitive fibers may be selected from any of those which, when wetted, loose their ability to hold all or part of their high to medium crimping, such as rayon, nylon, acetate or blends of these types. When a pouch, constructed with these fibers is wetted, the water sensitive crimped fibers loose their crimp and cause a physical altering of the interstitial spacings between the bonded areas. Since the fibers loose crimp, the length of the fiber segments between bonding sites increases, resulting in larger pore spacings, thus permitting larger particles of detergent within the pouch to pass through the non-woven surface and into the washing liquor.

BRIEF DESCRIPTION OF THE DRAWINGS

FIG. 1 is an elevational view of a detergent pouch constructed in accordance with the present invention;

FIG. 2 is a sectional detail view of the pouch when dry taken along the plane of line 2—2 in FIG. 1;

FIG. 3 is a view similar to FIG. 1 of the laundry detergent pouch when wetted; and, FIG. 4 is a sectional detail view taken along the plane of line 4—4 in FIG. 3 of the wetted pouch.

DETAILED DESCRIPTION OF THE INVENTION

With continuing reference to the accompanying drawing, wherein like reference numerals designate similar parts throughout the several views, the detergent pouch 10, constructed in accordance with the concepts of the present invention, is illustrated in a dry condition in FIG. 1. The pouch 10 is made from two webs of non-woven material 12 which are bonded as at 14 along the peripheral edges 16 with detergent particles 18 therebetween.

Alternatively, a single web 12 can be used which, when folded, forms two layers or plies of web 12 and, thereafter, the web layers are bonded on the remaining three sides along the periphery of the pouch 10.

It is particularly important to the present invention to recognize that the fibers 20 are formed at least in part or wholly of a water sensitive material, such as rayon, nylon, acetate or the like or a blend of these fibers. The fibers 20 are crimped as at 22. Thus, the length of the fibers is effectively foreshortened between bonding pouch between fibers. The fibers are chemically pattern bound or by using heat pattern bonding or like conventional bonding processes, the crimped fibers 22 are formed by conventional non-woven fabric manufacturing process into the non-woven web 12.

As aforesaid, besides using a web formed entirely of nylon or rayon or acetate fibers, blends of these fibers can be employed, each of the fibers being crimped to a predetermined extent.

Exhibit I

A blend of water sensitive fibers having the following proportions by weight is utilized:

70% rayon
30% nylon

These fibers are in a crimped condition when formed into a web.

EXAMPLE 2

The web is formed from crimped fibers having the following proportions by weight:

Nylon fibers: 25%
Acetate fibers: 25%
Rayon fibers: 50%

The fibers are either chemically pattern bound or heat pattern bound to form a web of desired denier to hold the smallest particles of laundry detergent normally encountered.

The laundry pouch, when immersed in water by disposition into the washing machine laundry liquor changes to pass essentially all of the laundry detergent particles. This is because the fibers 20 loose the crimp 22, thus elongating the fibers and the spaces between binding sites 24.

The elongation of the fibers 20 cause relatively large pores or interstice to be formed between the fibers 20, thus permitting event the largest size particles of detergent normally encountered to pass, especially when at least partially dissolved in the laundry liquor.

In addition to using fibers 20 made wholly of water sensitive materials, hydrophobic or non-water sensitive fibers can be used in part to provide for increased wet strength to the pouch. These hydrophobic fibers can be selected from fibers of polypropylene, polyester, or the like, and may be crimped or not crimped, as desired.

EXAMPLE 3

A blend of fibers may be used to form the web consisting essentially of the following the amounts being by weight:

Crimped nylon fibers: 25%
Crimped rayon fibers: 50%
Non-crimped polypropylene fibers: 25%

The fibers are formed into a non-woven web.

It is also within the concepts of the present invention to use some non-crimped water-sensitive fibers in the composition of the web to ensure suitable properties.

EXAMPLE 4

Nylon non-crimped fibers: 10%
Non-crimped polyester: 10%
Crimped acetate fibers: 30%
Crimped rayon fibers: 50%

The fibers are formed into the web by conventional process of manufacture.

Of course, the blends of fibers may be varied at will in accordance with desired resultant properties.

It is also within the concepts of the present invention to employ two different web materials, each of a different blend of material. As a further example, a first web according to Example 1 can be used with a web made in accordance with Example 4 to gain desired properties for the pouch 10.

The detergent pouches according to the present invention have the following advantages: The construction does not require water sensitive glues or films to bond the pouch seams or occlude the fabric pores. These are costly and may contaminate the laundry water when dissolved. Mechanically weak seams are unreliable and difficult to control during manufacture. Further, the degree of powder solubility can be tailored to the detergent being used by selecting the appropriate fiber blend, fiber crimp, bonding pattern or bonding technique.

What is claimed is:

1. A laundry detergent pouch comprising a pair of layers of a non-woven web material having laundry detergent particles therebetween and sealed along the periphery of the pouch by a seal that is not affected by water, said web being formed of fibers of crimped water sensitive material bonded together to retain the smaller detergent particles when said pouch is dry and when said pouch is wetted, said fibers lose their crimp and elongate, to form interstices therebetween of a size so that the largest detergent particles can pass therethrough.

2. A laundry detergent pouch according to claim 1, wherein said crimped fibers are selected from the group consisting of nylon, rayon and acetate and blends thereof.

3. A laundry detergent pouch according to claim 1, wherein said fibers are of crimped nylon.

4. A laundry detergent pouch according to claim 1, wherein said fibers are of crimped rayon.

5. A laundry detergent pouch according to claim 1, wherein said fibers are of crimped acetate.

6. A laundry detergent pouch according to claim 1, wherein said fibers include non-crimped fibers.

7. A laundry detergent pouch according to claim 1, including hydrophobic fibers of polyester or polypropylene.

8. A laundry detergent pouch according to claim 1, including some fibers of polypropylene.

9. A laundry detergent pouch according to claim 1, including some fibers of polyester.

* * * * *